Nov. 7, 1933.  J. J. WALLACE  1,934,575
SAW CYLINDER
Original Filed Sept. 21, 1932
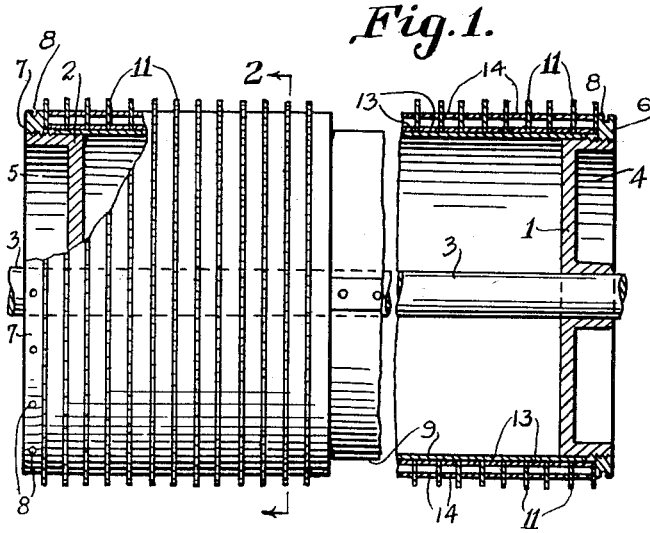
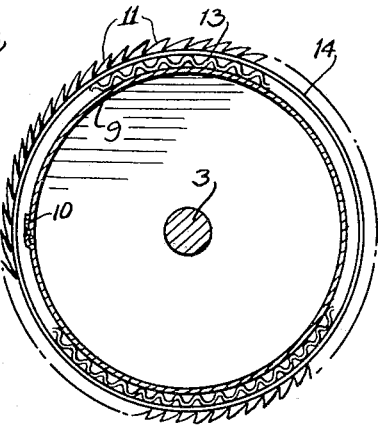
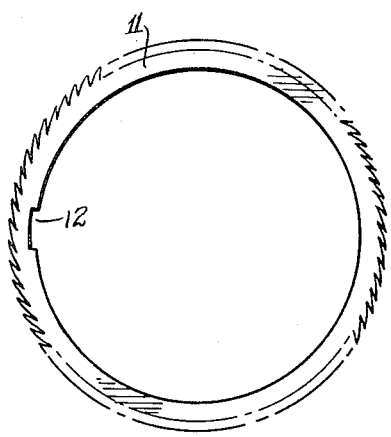
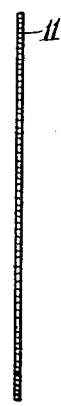
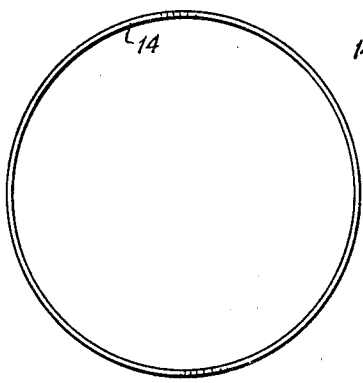
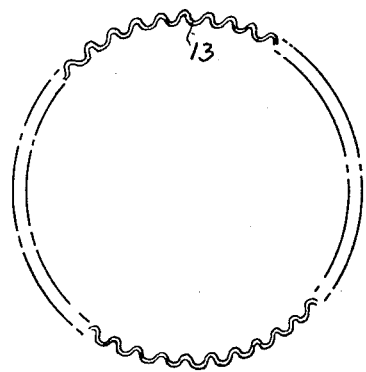
Inventor
J. J. WALLACE
By Mason Fenwick & Lawrence
Attorneys Patented Nov. 7, 1933

1,934,575

UNITED STATES PATENT OFFICE 1,934,575

SAW CYLINDER

Jeffrey John Wallace, Amite, La., assignor to Gullett Gin Company, Amite, La., a corporation of Louisiana Original application September 21, 1932, Serial No. 634,223. Divided and this application March 14, 1933. Serial No. 660,741

3 Claims. (Cl. 19—63)

This application is a division of my application, Serial No. 634,223, filed September 21, 1932 for Cotton huller and cleaner.

This application relates to saw cylinders for cotton seed linters and gin.

The main object of the invention is to provide a saw cylinder of very light weight, and of sufficient strength to withstand hard use.

Another object of the invention is to provide a saw cylinder constructed so that the saws may be readily detached from and mounted on their support whenever it becomes necessary to repair or replace them.

A further object of the invention resides in providing saws of this character with improved spacing devices whereby the saws may be properly spaced from each other, and in which the clamping pressure for securing the saws together is distributed well over the lateral surfaces of the saws.

Still another object of the invention is to provide an improved spacer for saws of this type in which pockets between the saws are eliminated.

Other objects of the invention will become apparent as the detailed description thereof proceeds.

In the drawing:

Figure 1 is a side elevation to an enlarged scale of the saw cylinders used in this apparatus, parts being broken away and shown in section to illustrate details of construction;

Figure 2 is a vertical transverse section taken on the line 2—2 of Figure 1;

Figure 3 is a side elevation of one of the saws shown in Figure 1;

Figure 4 is an end elevation of the saw shown in Figure 3;

Figure 5 is a side elevation of a corrugated spacer member forming part of the saw cylinder;

Figure 6 is an end elevation of the spacer shown in Figure 5;

Figure 7 is a side elevation of a spacer ring adapted to enclose the corrugated member shown in Figures 5 and 6; and Figure 8 is an end elevation of the ring shown in Figure 7.

As shown in the drawing, the invention comprises a pair of cast iron end walls 1 and 2 suitably secured to a shaft 3. The end walls 1 and 2 are provided with outwardly directed cylindrical flanges 4 and 5 having their external peripheries screwthreaded to receive the internal screwthreaded ring nuts 6 and 7, respectively. Each of the nuts 6 and 7 is provided with a plurality of capstan apertures 8 adapted to receive the end of any suitable rod or lever for the purpose of adjusting the rings toward and from each other on the end walls 1 and 2.

A cylinder 9, suitably formed of sheet metal and having an internal diameter equal to the external diameter of the end walls 1 and 2, is supported suitably on the end walls 1 and 2, as shown in Figure 1 of the drawing. In the formation of the cylinder 9, one of the longitudinal edges of the sheet forming said cylinder is bent to overlap the other edge and to form a member 10 projecting lengthwise of the cylinder to provide a key for preventing rotation of the saws around the cylinder 9.

Each of the saws 11 is blanked out of a sheet of steel in the form of an annulus, the inner periphery of which fits slidably but snugly over the outer periphery of the cylinder 9, the outer edge of the blank being cut in the usual manner to form saw teeth. The inner periphery of each of the saws is provided with a notch 12 adapted to fit snugly over key member 10 and is held thereby from rotation around the cylinder 9.

The saws 11 are spaced apart along the cylinder 9 by means of the annular corrugated spacers 13, adapted to slide snugly along the outer periphery of the cylinder 9. Each of these corrugated spacers 13 fits tightly within a cylindrical band 14 of the same width as the corrugated spacer. The arrangement of cylinder, spacers and saws, is shown clearly in Figure 2, in which it will be seen that the depth of the corrugations is such that when the bands 14 are superposed on the spacers 13, the outer periphery of each band will clear the saw teeth. By this construction, the saws are clamped securely by the spacers throughout the greater part of their lateral areas. As will be apparent from Figure 2 of the drawing, the cylinder must be somewhat shorter than the distance between the opposite faces of the ring nuts 6 and 7, in order to provide for proper clamping action of the spacers against the saws between the aforesaid ring nuts.

It will be apparent that the spacer elements employed in this construction not only possess great strength but are light and easily manufactured from inexpensive material. They are positioned accurately by contact with the periphery of the cylinder 9, and their clamping pressure is evenly distributed over the greater part of the lateral areas of the saws, whereby the saws may be clamped rigidly on the cylinder without danger of distortion. The cylindrical outer spacer 14 aids in keeping the saw cylinder as a whole clean since it eliminates the corrugated pockets which would otherwise be present.

It is thought that the invention and its advantages will be understood from the foregoing description and it is obvious that changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. In cotton cleaning apparatus, a shaft, circular end walls spaced apart and fixed to said shaft, a cylinder of sheet metal fixed to said end walls, a series of annular plates slidably and non-rotatably mounted on said cylinder and having saw teeth on their outer peripheries, spacers interposed between said plates, and means adjustable on the circular peripheries of said end walls for clamping said saws and spacers assembled on said cylinder.

2. In cotton cleaning apparatus, a shaft, externally screwthreaded circular end walls spaced apart and fixed to said shaft, a cylinder of sheet metal fixed at its opposite ends to said end walls, and having its opposite edges overlapped to form a key lengthwise thereon, a series of annular plates slidable non-rotatably on said cylinder and having saw teeth on their outer peripheries, spacers interposed between said plates, each of said spacers including a corrugated ring slidable on said cylinder and in contact with the periphery thereof, and screwthreaded rings mounted on the ends of said walls to clamp said annular saw plates and spacers together on said cylinder.

3. The device set forth in claim 2 in combination with a series of cylindrical casings equal in number to the number of corrugated rings, said casings and rings being of the same width, and each casing having the same internal diameter as the external diameter of each of said rings.

JEFFREY JOHN WALLACE.